United States Patent
Komazaki et al.

[15] 3,662,155
[45] May 9, 1972

[54] BASE UNIT FOR ELECTRIC LIQUID WARMER

[72] Inventors: Yujiro Komazaki, Urawa; Takeshi Watanabe, Chigasaki, both of Japan

[73] Assignee: Nakano Shunsuke, Tokyo, Japan

[22] Filed: Aug. 7, 1970

[21] Appl. No.: 61,994

[30] Foreign Application Priority Data

Aug. 19, 1969 Japan..................................44/78120

[52] U.S. Cl.................................219/432, 99/281, 219/328, 219/442, 219/450, 219/515, 219/516, 337/381
[51] Int. Cl..........................................H05b 1/02, H05b 3/02
[58] Field of Search.......................219/429–442, 449–450, 219/515, 516, 512, 419, 432, 433, 436, 438, 328; 99/326, 331, 328, 333, 281, 282; 337/360, 361, 375, 381

[56] References Cited

UNITED STATES PATENTS

| | | |
|---|---|---|
| 2,269,689 | 1/1942 | Reichold..............................219/435 |
| 2,769,061 | 10/1956 | White et al. ..........................337/361 |
| 2,888,548 | 5/1959 | Knapp...............................219/433 X |
| 2,427,945 | 9/1946 | Clark et al. ........................219/449 X |

Primary Examiner—A. Bartis
Attorney—Wenderoth, Lind & Ponack

[57] ABSTRACT

An electric liquid warmenr includes a vessel having an electric heater at its lower periphery and a base unit which detachably receives the vessel. The base unit and vessel have cooperating electrical contacts whereby the circuit to the heater is completed when the vessel is supported on the base unit. Carried by the base unit is an adjustable temperature control for effecting on-off control of the heater circuit. The control includes a fixed heat sensing plate disposed close to the bottom of the vessel and a thermostat including a bimetal, a fixed contact and a movable contact. One end of the bimetal is secured to the plate and the free end thereof operates the movable contact. A pivoted supporting plate carries the contacts. The position of the supporting plate and thereby the position of the movable contact relative to the bimetal is adjustable by a ring cam coupled to a temperature control ring on the base surrounding the vessel, whereby the on-off temperature can be selectively adjusted.

4 Claims, 3 Drawing Figures

PATENTED MAY 9 1972 3,662,155

INVENTOR
Y. Yamazaki
Takashi Watanabe

BY

ATTORNEY

BASE UNIT FOR ELECTRIC LIQUID WARMER

BACKGROUND OF THE INVENTION

The present invention relates to an improvement of a base unit for an electric liquid warmer which comprises a liquid vessel provided with a heater plate at its lower periphery and a base unit which receives the heater plate portion of the liquid vessel and being provided with an automatic temperature control means for effecting its temperature control.

The base unit for the liquid warmer is generally provided with a heat sensing plate as close as possible to the liquid to be heated in order to heat the liquid in the vessel at a fixed temperature, and an automatic temperature control unit consisting of a thermostat is disposed to control the application of current to the heater plate of the liquid vessel by operating a bimetal according to the detected temperature of the heat sensing plate. As the thermostat constituting this automatic temperature control unit, a fixed type thermostat has heretofore been employed which was formed as an integral unit with a bimetal and fixed and movable contacts. But its temperature control function was not effective and even if the fixed type thermostat was directly equipped with the heat sensing plate, the bimetal was separated from the heat sensing plate, and thus the sensitivity was poor which in turn made it impossible to effect delicate temperature control for the liquid being heated. Also, the fixed thermostat was of complicated construction owing to the fact that the set temperature was controlled by contacting a set temperature knob disposed a large distance without the device. Therefore in many cases the accuracy of the temperature control was poor and influence due to vibration was extremely great.

OBJECT AND BRIEF DESCRIPTION OF THE INVENTION

With the above discussion in mind, it is an object of the present invention to provide an electric liquid warmer capable of overcoming the above disadvantages.

This object is achieved in accordance with the present invention by providing a base plate supporting a supporting cylinder having an outer cylindrical portion and a flange portion. The flange portion has therein oppositely disposed circular arc holes. A supporting plate is mounted below the supporting cylinder and has one end adjustably secured thereto by a fulcrum screw. The other end is resiliently secured thereto by a spring shaft and a spring. The supporting plate supports a supporting shaft which extends into the supporting cylinder and has thereon a fixed contact and a movable contact. A pair of circular arc electrodes are mounted on the upper surface of the supporting cylinder and secured by a supporting ring which supports a heat sensing plate. One end of a bimetal is secured to the bottom side of the heat sensing plate and the other end has a connecting bar which abuts the movable contact. A rotatable temperature control ring surrounds the supporting cylinder and has oppositely disposed leg portions which extend through the circular arc holes. Inclined ring cams forming a desired cam surface are supported by the leg portions such that the lower edge of the cam surface presses the upper surface of the supporting plate. The liquid vessel has a heater plate disposed at the lower periphery thereof and a pair of electrodes attached to the heater plate such that when the vessel is inserted within the temperature control ring, the pair of electrodes contact the circular arc electrodes and the bottom of the vessel approaches the heat sensing plate.

Other features of the invention will be apparent from the following detailed description taken together with the accompanying drawings.

DETAILED DESCRIPTION OF THE INVENTION

Figure 1:
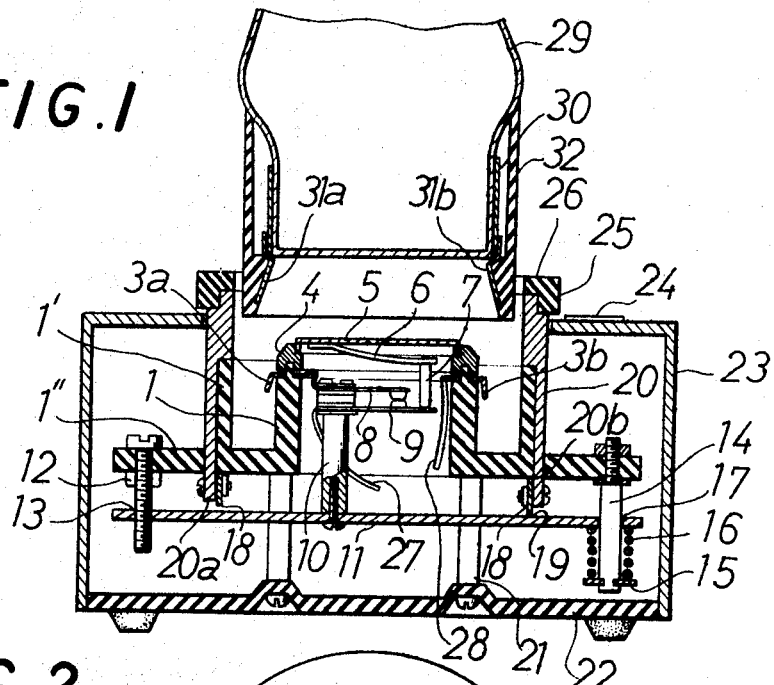
FIG. 1 is a side sectional view showing the setting of the liquid vessel on the base unit.
Figure 2:
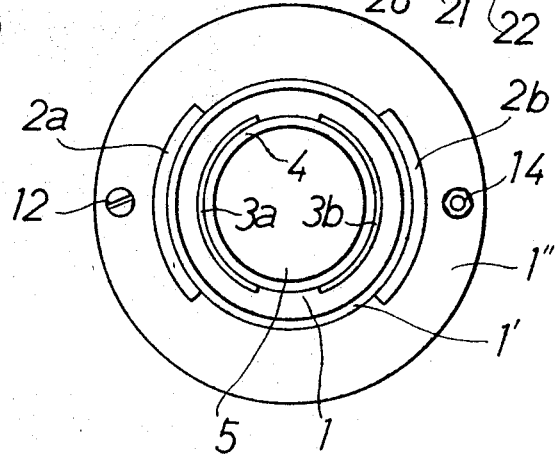
FIG. 2 is a plan of a supporting cylinder equipped with an electrodes which is provided in said base unit.
Figure 3:
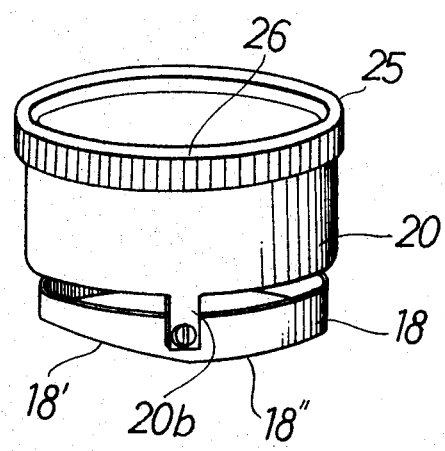
FIG. 3 is a perspective view of a temperature control ring equipped with an inclined ring cam which is provided on the base unit as illustrated in FIG. 2.

In the drawings, the supporting cylinder 1 made of electric insulating material is provided with an outer cylindrical portion 1' and a flange portion 1" in the vicinity thereof. Flange portion 1" is formed with circular arc holes 2a, 2b in a fixed angle range at opposed positions on a concentric circle along the outer cylindrical portion 1'.

A pair of circular arc electrodes 3a, 3b are disposed bilaterally on the upper edge of supporting cylinder 1. Circular arc electrodes 3a, 3b are secured by a heat sensing plate supporting ring 4 which supports a heat sensing plate 5. The base end of a bimetal 6 provided with a connecting bar 7 at its tip is fixed on the bottom side of the heat sensing plate 5. A fixed contact 8 and movable contact 9 are positioned on a supporting shaft 10 such that connecting bar 7 is caused to abut the movable contact 9, thereby forming a thermostat.

A supporting plate 11 which is disposed below the supporting cylinder 1 supports the supporting shaft 10 and has one end supported by a fulcrum screw 12 extending through one edge of the flange portion 1" and threaded into opening 13 in supporting plate 11. The position of this end of supporting plate 11 can be set arbitrarily by rotatably moving fulcrum screw 12 within opening 13. The other end of supporting plate 11 has an axial hole 17 receiving a spring shaft 14 to fit loosely therein. Shaft 14 is fixed at its upper end to flange portion 1" and at its other end has a spring base 15 supporting a spring 16. The bottom side of the supporting plate 11 has constantly applied thereto an upward elastic pressure by spring 16. A temperature control ring 20 surrounds outer cylindrical portion 1' and has oppositely disposed leg portions 20a and 20b extending through circular arc holes 2a and 2b of flange portion 1".

Inclined ring cams 18 which are formed in closed ring form are supported on leg portions 20a, 20b. The temperature control ring 20 is tightly fitted so as to be rotatable on the outer periphery of the outer cylinder portion 1' of the supporting cylinder 1. Part of the upper surface of the supporting plate 11 is contacted by the lower edge cam surface of the inclined ring cams 18 in opposition to the elastic action of the spring 16 whereby a working point 19 is formed. Since the leg portions 20a, 20b of the temperature control ring 20 are slidable in the angle range of the circular arc holes 2a, 2b, effective cam portions 18' — 18" including the working point 19 are formed on the inclined ring cams 18. The effective cam portions 18' — 18" form a cam surface of suitable configuration to control the range of the temperature. By rotating temperature control ring 20, working point 19 is moved, thereby raising or lowering supporting plate 11. Thus, the working temperature of the thermostat may be controlled.

Furthermore, the supporting cylinder 1 is supported on a base plate 22 by means of a plurality of leg rods 21. Base plate 22 is enclosed with a cover 23 which has an opening in the top thereof. Temperature control ring 20 extends through this opening above the upper surface of the cover 23. An ornament ring 25 which serves also as a knob is fixed to control ring 20. An indicating point 26 is set on the ornament ring 25 and a temperature scale is set by the indicating point 26 and a scale plate 24 formed on the upper surface of the cover 23. Wirings 27, 28 are attached to circular arc electrodes 3a and 3b whereby the current is applied through the thermostat.

The vessel 29 for the liquid to be heated is made and formed of a heat resisting glass or porcelain and has a flat heater plate 30 disposed at the lower periphery thereof. A pair of electrodes 31a and 31b are attached to the heater plate, and the entire heater plate is covered with the heat resisting and heat insulating vessel cover 32.

As may be obvious from the drawing, when vessel 29 is inserted in the temperature control ring 20 from the upper direction, electrodes 31a, 31b are connected to the circular arc electrodes 3a, 3b whereby a heater circuit is formed, and simultaneously, the bottom portion of the vessel 29 is caused to approach the heat sensing plate 5 for effecting detection of the temperature of the liquid.

The setting of the temperature is carried out by setting the temperature control ring 20 by the temperature scale on the scale plate 24 according to the indicating point 26 by turning the ring. With rotation of the temperature control ring 20, the inclined ring cam 18 rotates, and the supporting plate 11 is displaced. This displacement of the movable contact 9 with respect to connecting bar 7, and thus the set temperature of the thermostat is controlled.

Accordingly, when the liquid is placed in the vessel 29 and is set on the base unit, current is supplied to the heater plate 30 by means of the thermostat whereby the liquid is heated. The temperature of the liquid is simultaneously conducted to the bimetal 6 through the heat sensing plate 5, and when the temperature reaches the set temperature of the thermostat, bimetal 6 and bar 7 move contact 9 away from contact 8. Thus, the heater circuit is automatically broken to suspend the application of current to the heater plate 30. Then, when the temperature drops below the set temperature, bimetal 6 allows contact 9 to move toward contact 8. Thus, the thermostat is acted on once again to form the heater circuit whereby the liquid is maintained always at a desired temperature.

The bimetal 6 forming the thermostat is directly bonded to the heat sensing plate by means such as soldering, and therefore the sensitivity is extremely high for the heat to be conducted to the heater plate from the liquid vessel. Thus, delicate temperature control for the liquid in the vessel can be obtained and even in the case where the quantity of liquid in the liquid vessel is very small or when the vessel is empty abnormal heat generation is sensitively detected to operate the thermostat for the prevention of the damage to the liquid vessel. Because the fixed and movable contacts are mounted on the supporting plate, and because the supporting plate is balanced by the working point of the inclined ring cam and fulcrum in addition to the force of the spring, the thermostat is not influenced by vibration and impact from the outside. Therefore highly accurate temperature control can be effected in correspondence with the suitable inclined angle of the effective cam surface of the inclined ring cam.

Furthermore, since, arranging the fulcrum of the supporting plate to move vertically by the rotation of the fulcrum screw, the reference point of the thermostat after assembly can be accurately and easily obtained. Therefore an error in the course of manufacture or in the material itself can be sufficiently corrected. Also, because of the provision of the temperature control ring and the ornament ring on the center portion of the cover temperature control can be effected by the rotation of the rings which provides convenience in the use of the warmer. The construction of the present invention provides a compact electric liquid warmer which has good appearance as a unit.

What is claimed is:

1. An electric liquid warmer comprising a base plate; a supporting cylinder supported by said base plate and having an outer cylinder portion and a flange portion, said flange portion having therein oppositely disposed circular arc holes; a supporting plate mounted below said supporting cylinder and having a first side adjustably secured to said flange portion and a second opposite side elastically secured to and urged toward said flange portion; a supporting shaft secured to said supporting plate and extending upwardly therefrom into said supporting cylinder; a fixed contact and a movable contact secured to the upper end of said supporting shaft; a pair of circular arc electrodes mounted on the upper surface of said supporting cylinder; a heat sensing plate supported above said circular arc electrodes; a bimetal having one end thereof secured to the bottom side of said heat sensing plate and the other end thereof secured to a connecting bar abutting said movable contact; a rotatable temperature control ring surrounding said supporting cylinder and having a pair of oppositely disposed leg portions extending downwardly through said circular arc holes; inclined ring cams forming a desired cam surface supported by said leg portions such that the lowest portion of said cam surface presses the upper surface of said supporting plate; and a liquid vessel having a heater plate disposed at the lower periphery thereof and a pair of electrodes attached to said heater plate; said vessel dimensioned such that when said vessel is inserted within said temperature control ring, said pair of electrodes contact said pair of circular arc electrodes and the bottom surface of said vessel approaches said heat sensing plate.

2. A device as claimed in claim 1, further comprising a cover mounted on said base and having an opening through the upper surface thereof; said temperature control ring extending through said opening above said upper surface of said cover.

3. A device as claimed in claim 2, further comprising an ornament ring attached to the upper edge of said temperature control ring and having an indicating point thereon; and a scale plate mounted on said upper surface of said cover.

4. A device as claimed in claim 1, wherein said first side of said supporting plate is adjustably secured to said flange portion by means of a fulcrum screw; and said second side of said supporting plate has a hole therethrough, said device further comprising a spring shaft extending through said hole and secured to said flange portion, and a spring surrounding said spring shaft and positioned to urge said supporting plate toward said flange cylinder.

* * * * *